United States Patent
Kong et al.

(10) Patent No.: US 8,112,693 B2
(45) Date of Patent: Feb. 7, 2012

(54) ERROR CONTROL CODE APPARATUSES AND METHODS OF USING THE SAME

(75) Inventors: Jun Jin Kong, Yongin-si (KR); Seung-Hwan Song, Incheon (KR); Dong Hyuk Chae, Seoul (KR); Kyoung Lae Cho, Yongin-si (KR); Seung Jae Lee, Hwaseong-si (KR); Nam Phil Jo, Seoul (KR); Sung Chung Park, Daejeon (KR); Dong Ku Kang, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1161 days.

(21) Appl. No.: 11/905,734

(22) Filed: Oct. 3, 2007

(65) Prior Publication Data
US 2008/0276150 A1    Nov. 6, 2008

(30) Foreign Application Priority Data
May 2, 2007   (KR) .................. 10-2007-0042745

(51) Int. Cl.
*G11C 29/00* (2006.01)
(52) U.S. Cl. ....................... 714/765; 714/764
(58) Field of Classification Search ........... 711/105; 714/758, 763, 766, 769, 718, 765, 764
See application file for complete search history.

(56) References Cited

U.S. PATENT DOCUMENTS

| | | | |
|---|---|---|---|
| 6,397,290 B1 * | 5/2002 | Williams et al. ............ | 711/105 |
| 6,651,211 B1 | 11/2003 | Abe et al. | |
| 6,851,081 B2 * | 2/2005 | Yamamoto .................... | 714/763 |
| 7,103,829 B2 | 9/2006 | Van Dijk et al. | |
| 7,356,755 B2 * | 4/2008 | Fackenthal .................... | 714/766 |
| 7,739,576 B2 * | 6/2010 | Radke ............................ | 714/758 |
| 7,779,334 B2 * | 8/2010 | Earle et al. .................... | 714/763 |
| 7,810,017 B2 * | 10/2010 | Radke ........................... | 714/769 |

(Continued)

FOREIGN PATENT DOCUMENTS

JP       10-275417 A      10/1998

(Continued)

OTHER PUBLICATIONS

Decision to Grant issued by the Korean Intellectual Property Office on Jul. 31, 2008, for the corresponding Korean Patent Application No. 10-2007-0042745.

(Continued)

*Primary Examiner* — David Ton
(74) *Attorney, Agent, or Firm* — Harness, Dickey & Pierce, P.L.C.

(57) ABSTRACT

An Error Control Code (ECC) apparatus applied to a memory of a Multi-Level Cell (MLC) method may include: a bypass control signal generator generating a bypass control signal; and an ECC performing unit that may include at least two ECC decoding blocks, determining whether to bypass a portion of the at least two ECC decoding blocks based on the bypass control signal, and/or performing an ECC decoding. In addition or in the alternative, the ECC performing unit may include at least two ECC encoding blocks, determining whether to bypass a portion of the at least two ECC encoding blocks based on the bypass control signal, and/or performing an ECC encoding. An ECC method applied to a memory of a MLC method and a computer-readable recording medium storing a program for implementing an EEC method applied to a memory of a MLC method are also disclose.

29 Claims, 6 Drawing Sheets

U.S. PATENT DOCUMENTS

| | | |
|---|---|---|
| 2003/0095056 A1 | 5/2003 | Tolhuizen et al. |
| 2005/0050431 A1 | 3/2005 | Guo et al. |

FOREIGN PATENT DOCUMENTS

| | | |
|---|---|---|
| JP | 2000-251484 A | 9/2000 |
| JP | 2004-040199 A | 2/2004 |
| KR | 10-1998-014888 | 5/1998 |
| KR | 10-1999-012103 | 2/1999 |
| KR | 10-2004-0017562 | 2/2004 |
| KR | 10-2005-0056543 | 6/2005 |

OTHER PUBLICATIONS

Notification of Transmittal of the International Search Report and the Written Opinion of the International Searching Authority or the Declaration dated Jan. 31, 2008, for International Application No. PCT/KR2007/005495 (3 pp.).

International Search Report dated Jan. 31, 2008, for International Application No. PCT/KR2007/005495 (3 pp.).

Written Opinion dated Jan. 31, 2008, for International Application No. PCT/KR2007/005495 (5 pp.).

* cited by examiner

ERROR CONTROL CODE APPARATUSES AND METHODS OF USING THE SAME

PRIORITY STATEMENT

This application claims priority from Korean Patent Application No. 10-2007-0042745, filed on May 2, 2007, in the Korean Intellectual Property Office (KIPO), the entire contents of which are incorporated herein by reference.

BACKGROUND

1. Field

Example embodiments relate to Error Control Codes (ECC). Also, example embodiments relate to ECC apparatuses and methods that can determine whether to bypass a portion of ECC blocks, depending on an error level generated in a channel, and can control ECC performance.

2. Description of Related Art

When error levels generated in a channel are different, an optimized ECC structure is generally embodied depending on an error level.

Specifically, when the error level generated in the channel is low, the error level may be corrected using one ECC block. Also, when the error level generated in the channel is high, the error level may be corrected using one ECC block. However, since high-level error correction capacity using one ECC block is required when the error level generated in the channel is high, an ECC structure having high-level complexity is required.

Accordingly, when the error level generated in the channel is high, a concatenated ECC structure, which may have identical performance with generally low complexity compared with using one ECC block, is used.

However, since an ECC calculation is performed using all ECC blocks regardless of an error level of a channel side, latency is unnecessarily lengthened, unnecessary power consumption is generated, and an unnecessary redundancy data transmission is required when the error level of the channel side is lowered. Accordingly, a ratio of an information amount to a total code length, that is, a code rate is unnecessarily reduced.

Also, when the error level generated in the channel side is low, the ECC structure including one ECC block is used, and when the error level generated in the channel side is high, two structures may be configured together in order to use the concatenated ECC structure. However, complexity of a circuit is increased in this case.

Accordingly, an apparatus which can reduce complexity and control ECC performance depending on an error level generated in a channel is required.

SUMMARY

Example embodiments may provide ECC structures that may control ECC performance depending on an error level generated in a channel and/or may have low complexity.

Example embodiments may provide ECC apparatuses and/or methods that may bypass a portion of ECC blocks and/or reduce latency when an error level generated in a channel is lower than (or lower than or equal to) a value that may or may not be predetermined.

Example embodiments may provide ECC apparatuses and/or methods that may convert a power mode of a bypassed ECC block from among ECC blocks into a lower power mode not performing an ECC calculation and/or may reduce unnecessary power consumption.

Example embodiments may provide ECC apparatuses and/or methods that may reduce an amount of redundant data required for an ECC process and/or improve a code rate to a total code length by bypassing a portion of ECC blocks.

Example embodiments may provide ECC structures that may control ECC performance, depending on a change of an error level when an error level of a channel side is changed, depending on a number of times of repetitious usage of a product.

Example embodiments may provide ECC structures that may control ECC performance, depending on a change of an error level when an error level of a channel side is changed, depending on a period of time of usage of a product.

Example embodiments may provide ECC structures that may control ECC performance, depending on a change of a channel error level by a Single Level Cell (SLC) operation method and/or a Multi-Level Cell (MLC) operation method of a memory cell when a memory is used for a channel.

Example embodiments may provide ECC structures that may control ECC performance, depending on a change of a channel error level based on a storage bit including a Least Significant Bit (LSB), a Most Significant Bit (MSB), and the like, when a memory of an MLC operation method is used for a channel.

According to example embodiments, an ECC apparatus applied to a memory of a Multi-Level Cell (MLC) method may include: a bypass control signal generator generating a bypass control signal; and/or an ECC performing unit, including at least two ECC decoding blocks, determining whether to bypass a portion of the at least two ECC decoding blocks based on the bypass control signal, and/or performing an ECC decoding.

According to example embodiments, an ECC apparatus applied to a memory of a MLC method may include: a bypass control signal generator generating a bypass control signal; and/or an ECC performing unit, including at least two ECC encoding blocks, determining whether to bypass a portion of the at least two ECC encoding blocks based on the bypass control signal, and/or performing an ECC encoding.

According to example embodiments, an ECC method applied to a memory of a MLC method may include: generating a bypass control signal; determining whether to bypass a portion of at least two ECC decoding blocks based on the bypass control signal; and/or performing ECC decoding.

According to example embodiments, an ECC method applied to a memory of a MLC method may include: generating a bypass control signal; determining whether to bypass a portion of at least two ECC encoding blocks based on the bypass control signal; and/or performing ECC encoding.

According to example embodiments, a computer-readable recording medium storing a program for implementing an ECC method applied to a memory of a MLC method may include: generating a bypass control signal; determining whether to bypass a portion of at least two ECC decoding blocks based on the bypass control signal; and/or performing ECC decoding.

According to example embodiments, a computer-readable recording medium storing a program for implementing an ECC method applied to a memory of a MLC method may include: generating a bypass control signal; determining whether to bypass a portion of at least two ECC encoding blocks based on the bypass control signal; and/or performing ECC encoding.

BRIEF DESCRIPTION OF THE DRAWINGS

The above and/or other aspects and advantages will become more apparent and more readily appreciated from the following description of example embodiments taken in conjunction with the accompanying drawings, in which.

DETAILED DESCRIPTION OF EXAMPLE EMBODIMENTS

Figure 1:
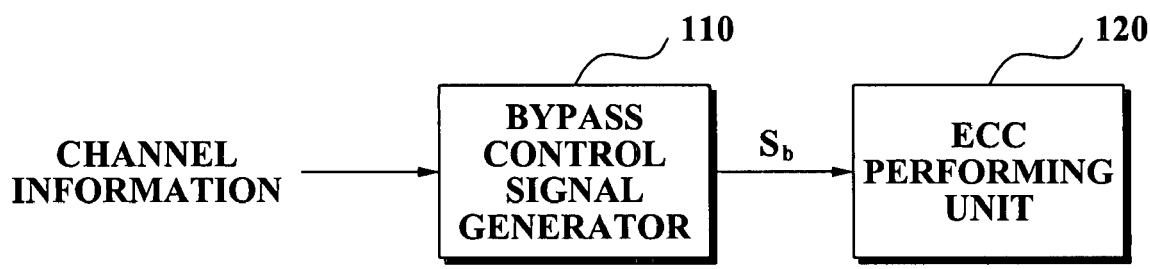
FIG. 1 is a block diagram illustrating an Error Control Code (ECC) apparatus according to example embodiments.

Example embodiments will now be described more fully with reference to the accompanying drawings. Embodiments, however, may be embodied in many different forms and should not be construed as being limited to example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating an Error Control Code (ECC) apparatus according to example embodiments.

Referring to FIG. 1, the ECC apparatus may include a bypass control signal generator 110 and/or an ECC performing unit 120.

The bypass control signal generator 110 may generate a bypass control signal $S_b$.

In example embodiments, the bypass control signal generator 110 may generate the bypass control signal $S_b$ that bypasses a portion of at least two ECC blocks, or may generate the bypass control signal $S_b$ that does not bypass the portion of the at least two ECC blocks.

In example embodiments, the bypass control signal generator 110 may generate the bypass control signal $S_b$ based on channel information inputted from a channel.

In example embodiments, the channel information may be a channel monitoring result including a Bit Error Rate (BER) inputted from the channel, a Received Signal Strength Indication (RSSI), a user input signal inputted from a user, and the like. Also, the channel information may include other information determining an error level of a channel side besides the BER, the RSSI, and/or the user input signal.

In example embodiments, the channel may be a communication channel, a storage channel, and the like, and/or examples of the channel may be a wireless section, a hard disk (HD), a Compact Disk (CD), a Digital Video Disk (DVD), a memory, and the like. Also, the channel of the ECC apparatus according to example embodiments may be the memory.

In example embodiments, the memory may include a memory of a Single Level Cell (SLC) method and/or a memory of a Multi-Level Cell (MLC) method.

As an example, when a data storage apparatus is used for the channel, the channel information may include reliability, including endurance of a storage apparatus, retention of stored data, and the like.

As another example, when the memory is used for the channel, the channel information may include whether to be either the memory of the SLC method or the memory of the MLC method, depending on an amount data that may be stored in a unit memory cell, and the like.

As still another example, when the memory of the MLC method is used for the channel, the channel information may be bit information of data stored in the memory. In example embodiments, the bit information of the data stored in the MLC memory may include a Most Significant Bit (MSB), a Least Significant Bit (LSB), and the like.

Also, the bypass control signal generator 110 may generate the bypass control signal $S_b$ based on the BER of the channel side acquired based on the channel information and/or a standard BER. In example embodiments, the standard BER may be the BER of the channel side in which a BER of data, that is outputted to a target side via ECC decoding blocks when the portion of the at least two ECC blocks, that is, either the portion of at least two ECC encoding blocks or the portion of at least two ECC decoding blocks is bypassed, is lower than or equal to (or lower than) a target BER. The standard BER may be changed depending on which ECC encoding blocks and/or ECC decoding blocks are bypassed.

In example embodiments, the bypass control signal generator 110 may compare the BER of the channel side and the standard BER. When the BER of the channel side is higher than (or higher than or equal to) the standard BER, the bypass control signal generator 110 may generate the bypass control signal $S_b$ that does not bypass the portion of the at least two ECC blocks and/or may enable either an ECC encoding or an ECC decoding to be performed. When the BER of the channel side is lower than or equal to (or lower than) the standard BER, the bypass control signal generator 110 may generate the bypass control signal $S_b$ that bypasses the portion of the at least two ECC blocks and/or may enable either the ECC encoding or the ECC decoding to be performed.

In example embodiments, the bypassed ECC blocks may be changed depending on the standard BER.

The ECC performing unit 120 may determine whether to bypass the portion of the at least two ECC blocks based on the bypass control signal $S_b$ generated by the bypass control signal generator 110 and/or may perform either the ECC encoding or the ECC decoding.

In example embodiments, the ECC performing unit 120 may include the at least two ECC encoding blocks performing the ECC encoding and/or the at least two ECC decoding blocks performing the ECC decoding. Also, the ECC performing unit 120 may perform either the ECC encoding or the ECC decoding either bypassing the portion of the at least two ECC encoding blocks and/or the portion of the at least two ECC decoding blocks, or not bypassing the portion of the at least two ECC encoding blocks and/or the portion of the at least two ECC decoding blocks, in response to the bypass control signal $S_b$.

In example embodiments, the ECC block bypassed from among the at least two ECC blocks included in the ECC performing unit 120 may receive the bypass control signal $S_b$ and/or may convert a power mode into another power mode corresponding to the received bypass control signal $S_b$.

In example embodiments, when the bypass control signal $S_b$ bypassing the ECC block is received, the ECC block may convert the power mode into the other power mode for not performing the ECC calculation, for example, a lower power mode (that may or may not be predetermined), in order to reduce unnecessary power consumption of the bypassed ECC block. Also, when the bypass control signal $S_b$ using the ECC block in the lower power mode, that is, the bypass control signal $S_b$ not bypassing the ECC block is received, the ECC block may convert the power mode into the other power mode for performing the ECC calculation, for example, an active mode.

As described above, the ECC apparatus according to example embodiments may perform ECC performance for various error levels since a number of ECC blocks used from among the at least two ECC blocks may be controlled depending on the error level generated in the channel. For example, the ECC apparatus according to example embodiments may be applied to an MLC flash memory in which the error level is changed depending on a page.

Figure 2:
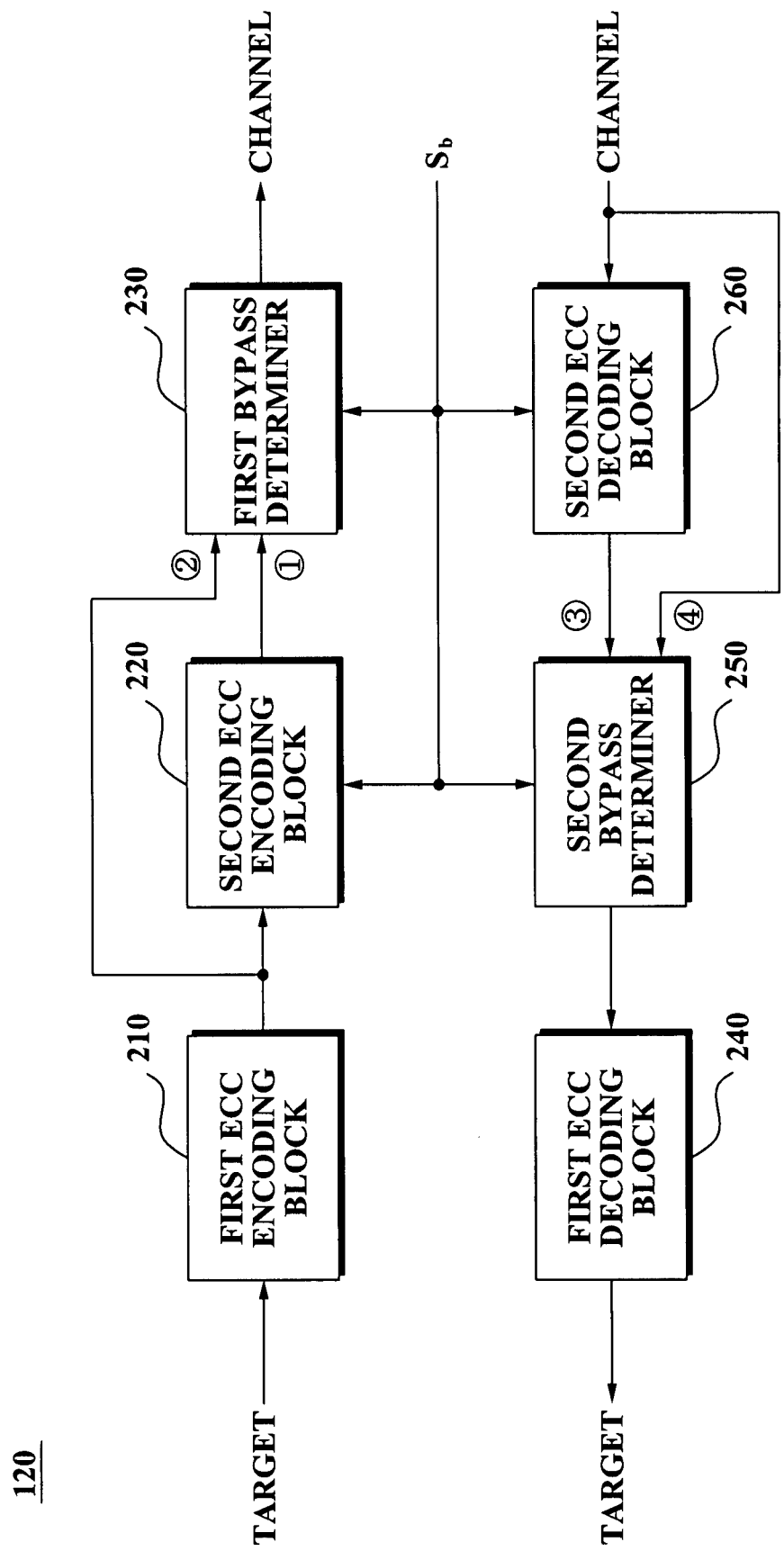
FIG. 2 is a diagram illustrating an ECC performing unit of FIG. 1 in detail.

FIG. 2 is a diagram illustrating an ECC performing unit 120 of FIG. 1 in detail, an example embodiment in which the ECC performing unit 120 includes two ECC encoding blocks and two ECC decoding blocks.

Referring to FIG. 2, the ECC performing unit 120 may include a first ECC encoding block 210, a second ECC encoding block 220, a first ECC decoding block 240, a second ECC decoding block 260, a first bypass determiner 230, and/or a second bypass determiner 250.

The first ECC encoding block 210 may perform an ECC encoding of data inputted from a target side.

The second ECC encoding block 220 may perform an ECC encoding of data inputted from the first ECC encoding block 210.

In example embodiments, the second ECC encoding block 220 may receive a bypass control signal $S_b$ and/or may convert a power mode into another power mode corresponding to the received bypass control signal $S_b$.

In example embodiments, when the received bypass control signal $S_b$ is the bypass control signal that bypasses a block, the second ECC encoding block 220 may convert the power mode into a lower power mode that may or may not be predetermined. When the received bypass control signal $S_b$ is the bypass control signal that does not bypass the block, the second ECC encoding block 220 may convert the power mode into an active mode.

The first bypass determiner 230 may determine a first route ① or a second route ② based on the bypass control signal $S_b$ received from the bypass control signal generator 110, and/or may output, to a channel side, either data encoded by the first ECC encoding block 210 and the second ECC encoding block 220, or data encoded by the first ECC encoding block 210.

In example embodiments, the first bypass determiner 230 may be a 2×1 multiplexer selectively outputting any one of two inputs.

In example embodiments, the first bypass determiner 230 may select and/or may output, to the channel side, any one of the data in which the ECC encoding is performed, the data being inputted passing through the first ECC encoding block 210 and the second ECC encoding block 220, and/or the data in which the ECC encoding is performed, the data being inputted passing through only the first ECC encoding block 210 using the bypass control signal $S_b$ as a selection signal.

In example embodiments, when the received bypass control signal $S_b$ is the bypass control signal that does not bypass the second ECC encoding block 220, the first bypass determiner 230 may determine a route outputted to the channel side as the first route ①. When the received bypass control signal $S_b$ is the bypass control signal that bypasses the second ECC encoding block 220, the first bypass determiner 230 may determine a route outputted to the channel side as the second route ②.

In example embodiments, since ECC performance is required to increase when the BER of the channel side acquired from the channel information is higher (or higher than or equal to) than the standard BER due to the high error level generated in the channel, the ECC encoding may be performed using both the first ECC encoding block 210 and the second ECC encoding block 220. Also, since a need for increasing the ECC performance may be eliminated when the BER of the channel side acquired from the channel information is lower than or equal to (or lower than) the standard BER due to the low error level generated in the channel, the ECC encoding may be performed using only the first ECC encoding block 210.

The first ECC decoding block 240 may perform the ECC decoding of the data inputted from the second bypass determiner 250.

The second ECC decoding block 260 may perform the ECC decoding of the data inputted from the channel.

In example embodiments, the second ECC decoding block 260 may receive a bypass control signal $S_b$ and/or may convert a power mode into another power mode corresponding to the received bypass control signal $S_b$.

In example embodiments, when the received bypass control signal $S_b$ is the bypass control signal that bypasses a block, the second ECC decoding block 260 may convert the power mode into a lower power mode. When the received bypass control signal $S_b$ is the bypass control signal that does not bypass the block, the second ECC decoding block 260 may convert the power mode into an active mode.

The second bypass determiner 250 may determine a third route ③ or a fourth route ④ based on the bypass control signal $S_b$ received from the bypass control signal generator 110, and may output, to the first ECC decoding block 240, either data decoded by the second ECC decoding block 260 or raw data inputted from the channel side.

In example embodiments, the second bypass determiner 250 may be a 2×1 multiplexer selectively outputting any one of two inputs.

In example embodiments, when the received bypass control signal $S_b$ is the bypass control signal that does not bypass the second ECC decoding block 260, the second bypass determiner 250 may determine a route outputted to the first ECC decoding block 240 as the third route ③. When the received bypass control signal $S_b$ is the bypass control signal that bypasses the second ECC decoding block 260, the second bypass determiner 250 may determine a route outputted to the first ECC decoding block 240 as the fourth route ④.

Also, when the portion of either the at least two ECC encoding blocks or the at least two ECC decoding blocks is bypassed, the ECC encoding blocks and/or the ECC decoding blocks that are not bypassed are required to be able to correct an error of data received from the channel side in order to lower the BER of data outputted to the target side up to a target BER level.

As illustrated in FIG. 2, the second ECC encoding block 220 and/or the second ECC decoding block 260 may reduce unnecessary power consumption of the ECC apparatus according to example embodiments since the power mode is controlled depending on the bypass control signal.

Also, since the first bypass determiner 230 may determine the first route ① or the second route ② and/or the second bypass determiner 250 may determine the third route ③ or the fourth route ④ depending on the error level, complexity of the block may be reduced, compared with respectively embodying the block for each case.

Also, since the portion of the at least two ECC blocks may be bypassed when the error level is low, latency may be reduced.

Also, since the portion of the at least two ECC blocks is not bypassed and all ECC blocks are used when the error level is high, a code having a low code rate may be used. However, since the portion of the at least two ECC blocks may be bypassed when the error level is low, a code having a high code rate may be used. Accordingly, a total code rate may be improved.

Figure 3:
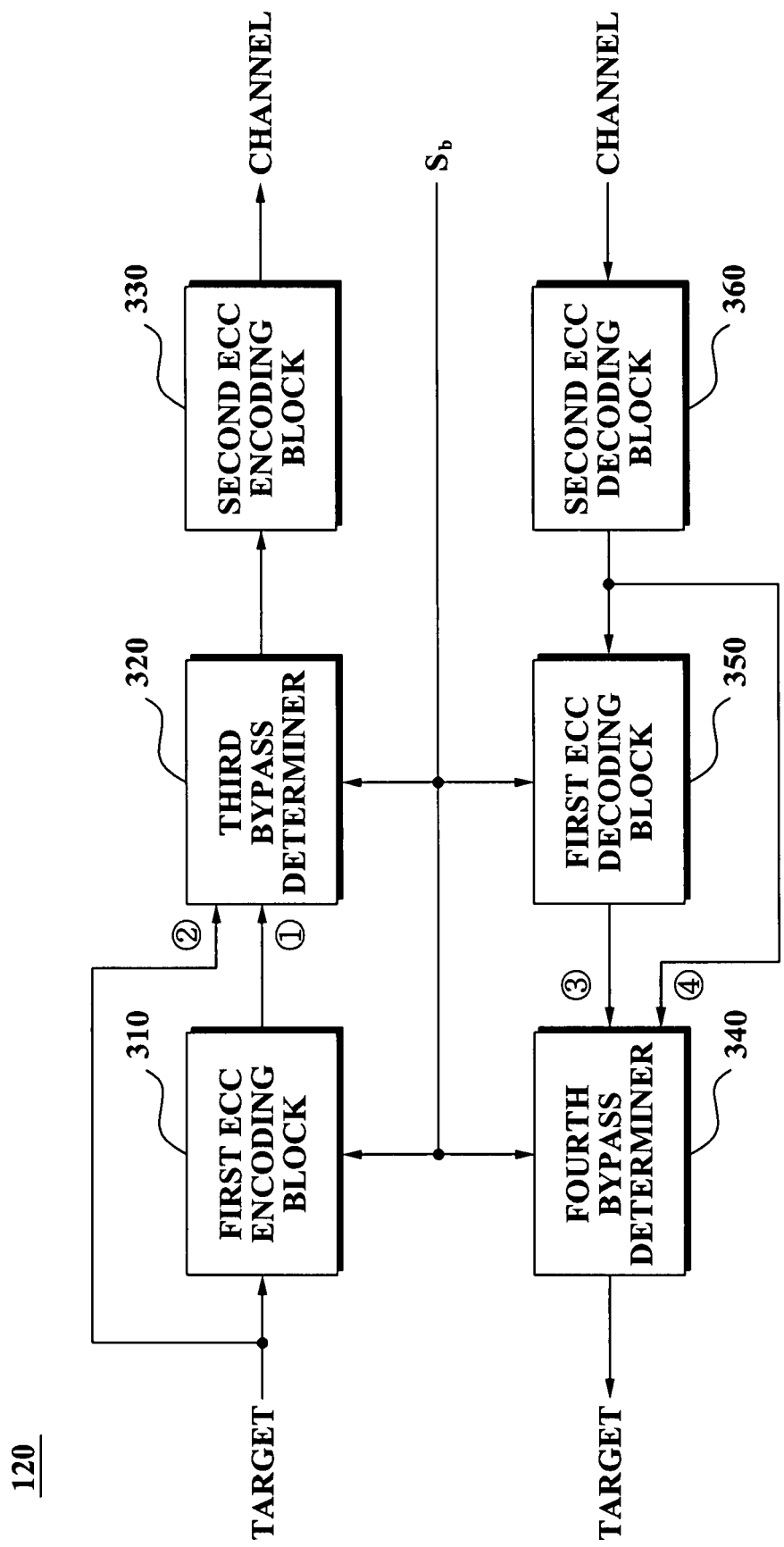
FIG. 3 is a diagram illustrating another ECC performing unit of FIG. 1 in detail.

FIG. 3 is a diagram illustrating another ECC performing unit 120 of FIG. 1 in detail.

Referring to FIG. 3, the ECC performing unit 120 may include a first ECC encoding block 310, a second ECC encoding block 330, a first ECC decoding block 350, a second ECC decoding block 360, a third bypass determiner 320, and/or a fourth bypass determiner 340.

As illustrated in FIG. 3, it is understood that locations of the third bypass determiner 320, the fourth bypass determiner 340, and a block to bypass may be different compared with the first bypass determiner 230 and the second bypass determiner 250 of FIG. 2.

Accordingly, only the first ECC encoding block 310, the first ECC decoding block 350, the third bypass determiner 320, and the fourth bypass determiner 340 are described in FIG. 3.

The first ECC encoding block 310 and the first ECC decoding block 350 may receive a bypass control signal $S_b$ and/or may convert a power mode into another power mode corresponding to the received bypass control signal $S_b$.

In example embodiments, when the received bypass control signal $S_b$ is the bypass control signal that bypasses a block, the first ECC encoding block 310 and/or the first ECC decoding block 350 may convert the power mode into a lower power mode. When the received bypass control signal $S_b$ is the bypass control signal that does not bypass the block, the first ECC encoding block 310 and/or the first ECC decoding block 350 may convert the power mode into an active mode.

The third bypass determiner 320 may determine a first route ① or a second route ② based on the bypass control signal $S_b$ received from the bypass control signal generator 110, and may output, to the second ECC encoding block 330, either data encoded by the first ECC encoding block 310, or raw data inputted from a target side.

The fourth bypass determiner 340 may determine the third route ③ or the fourth route ④ based on the bypass control signal $S_b$ received from the bypass control signal generator 110, and may output, to the target side, either data decoded by the first ECC decoding block 350 and the second ECC decoding block 360 or data decoded by the second ECC decoding block 360.

Figure 4:
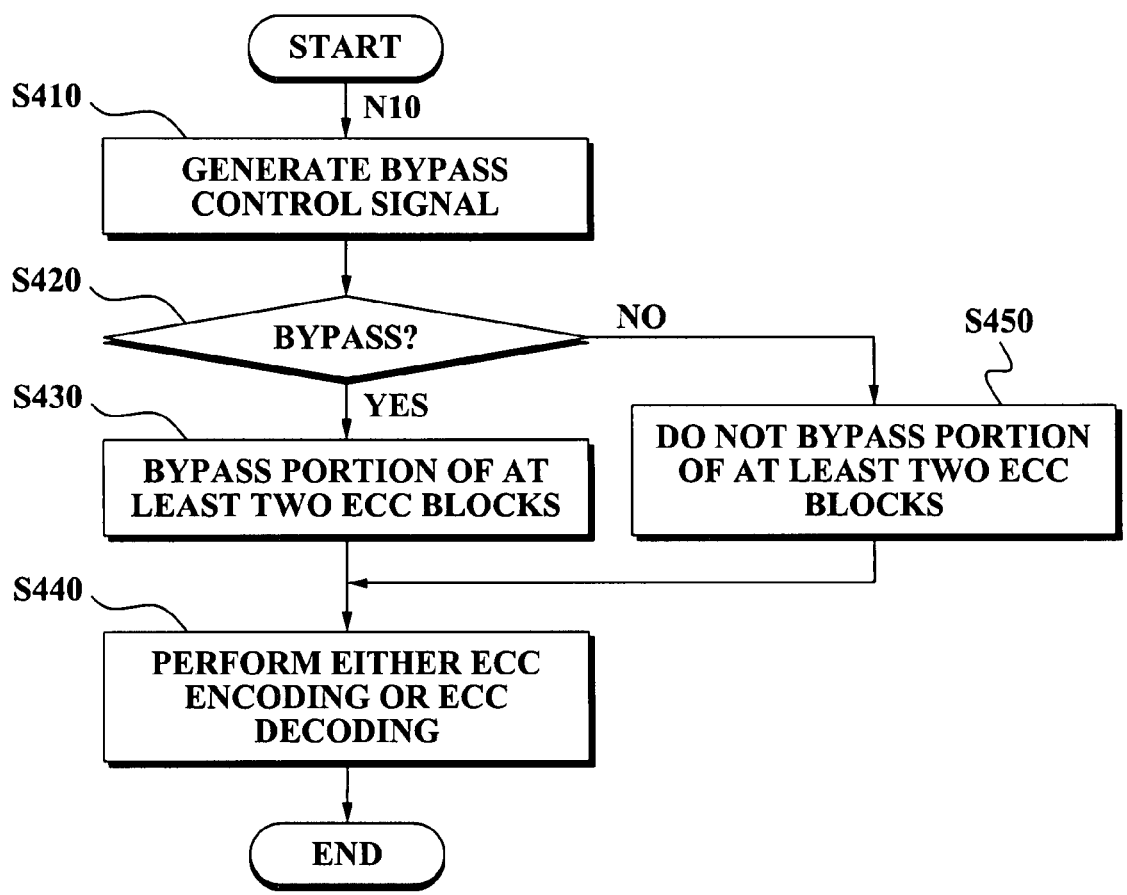
FIG. 4 is a flowchart illustrating an ECC method according to example embodiments.

FIG. 4 is a flowchart illustrating an ECC method according to example embodiments.

Referring to FIG. 4, the ECC method may generate a bypass control signal based on channel information acquired from a channel monitoring result or a user input signal, in operation S410.

In example embodiments, a channel may be a communication channel, a storage channel, and the like, and examples of the channel may be a wireless section, a HD, a CD, a DVD, a memory, and the like. Also, the channel of the ECC method according to example embodiments may be the memory.

In example embodiments, the bypass control signal may be generated based on a BER of a channel side acquired from channel information.

In example embodiments, the bypass control signal may be generated based on an RSSI of the channel side acquired from the channel information.

In example embodiments, the bypass control signal may be a signal related to reliability including endurance of an apparatus acquired from the channel monitoring result or the user input signal, retention of stored data, and the like.

In example embodiments, the bypass control signal may include whether the channel acquired from the channel monitoring result or the user input signal is either a memory of a SLC method or a memory of an MLC method, and the like.

In example embodiments, the bypass control signal may be bit information of data stored in the memory acquired from the channel monitoring result or the user input signal.

In example embodiments, the generated bypass control signal may be the bypass control signal that bypasses a portion of at least two ECC blocks, or may be the bypass control signal that does not bypass the portion of the at least two ECC blocks.

Next, whether the generated bypass control signal is the bypass control signal that bypasses the portion of the at least two ECC blocks may be determined in operation S420.

When it is determined that the generated bypass control signal is the bypass control signal that bypasses the portion of the at least two ECC blocks in operation S420, the portion of the at least two ECC blocks may be bypassed in operation S430, and either an ECC encoding or an ECC decoding may be performed using at least one ECC block that is not bypassed, in operation S440.

Conversely, when it is determined that the generated bypass control signal is the bypass control signal that does not bypass the portion of the at least two ECC blocks in operation S420, the portion of the at least two ECC blocks may not be bypassed in operation S450, and either the ECC encoding or the ECC decoding may be performed in operation S440.

In example embodiments, each bypassed ECC block may receive the bypass control signal and may convert a power mode into either a lower power mode or an active mode based on the received bypass control signal.

Figure 5:
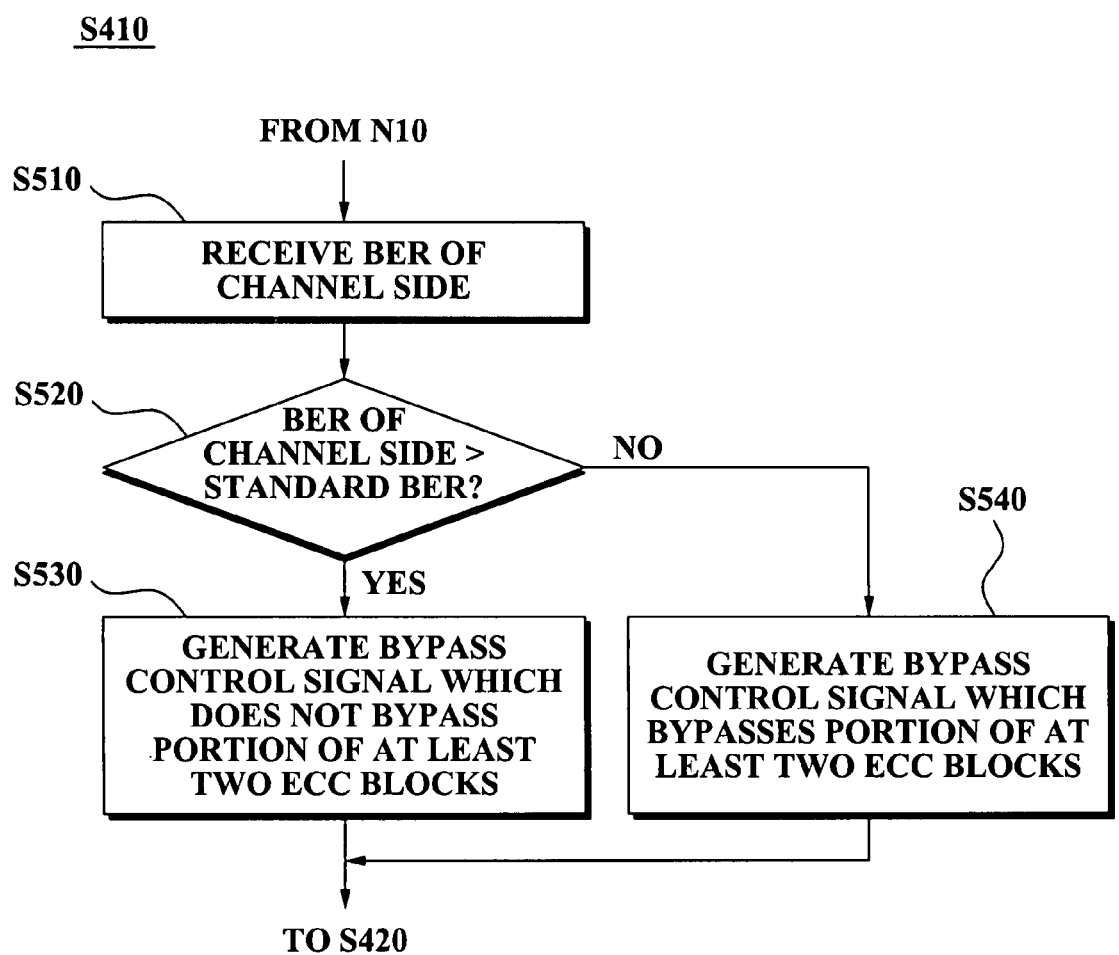
FIG. 5 is a flowchart illustrating operation S410 of FIG. 4 in detail.

FIG. 5 is a flowchart illustrating operation S410 of FIG. 4 in detail.

FIG. 5 may illustrate, for example, generating a bypass control signal based on a BER of a channel side acquired from channel information.

Referring to FIG. 5, the generating of the bypass control signal $S_b$ may receive the BER of the channel side based on channel information acquired from a channel monitoring result or a user input signal, in operation S510.

Whether the BER of the channel side is higher than (or higher than or equal to) a standard BER (that may or may not be predetermined) may be determined in operation S520. When it is determined that the BER of the channel side is higher than (or higher than or equal to) the standard BER in operation S520, the bypass control signal that does not bypass the portion of the at least two ECC blocks may be generated in operation S530.

Conversely, when it is determined that the BER of the channel side is lower than or equal to (or lower than) the standard BER, in operation S520, the bypass control signal that bypasses the portion of the at least two ECC blocks may be generated in operation S540.

In example embodiments, since ECC performance may be required to increase when an error level generated in the channel is higher than (or higher than or equal to) the standard BER, the bypass control signal that does not bypass the portion of the at least two ECC blocks may be generated. Also, since a need for increasing the ECC performance may be eliminated when the error level generated in the channel is lower than or equal to (or lower than) the standard BER, the bypass control signal that bypasses the portion of the at least two ECC blocks may be generated.

Figure 6:
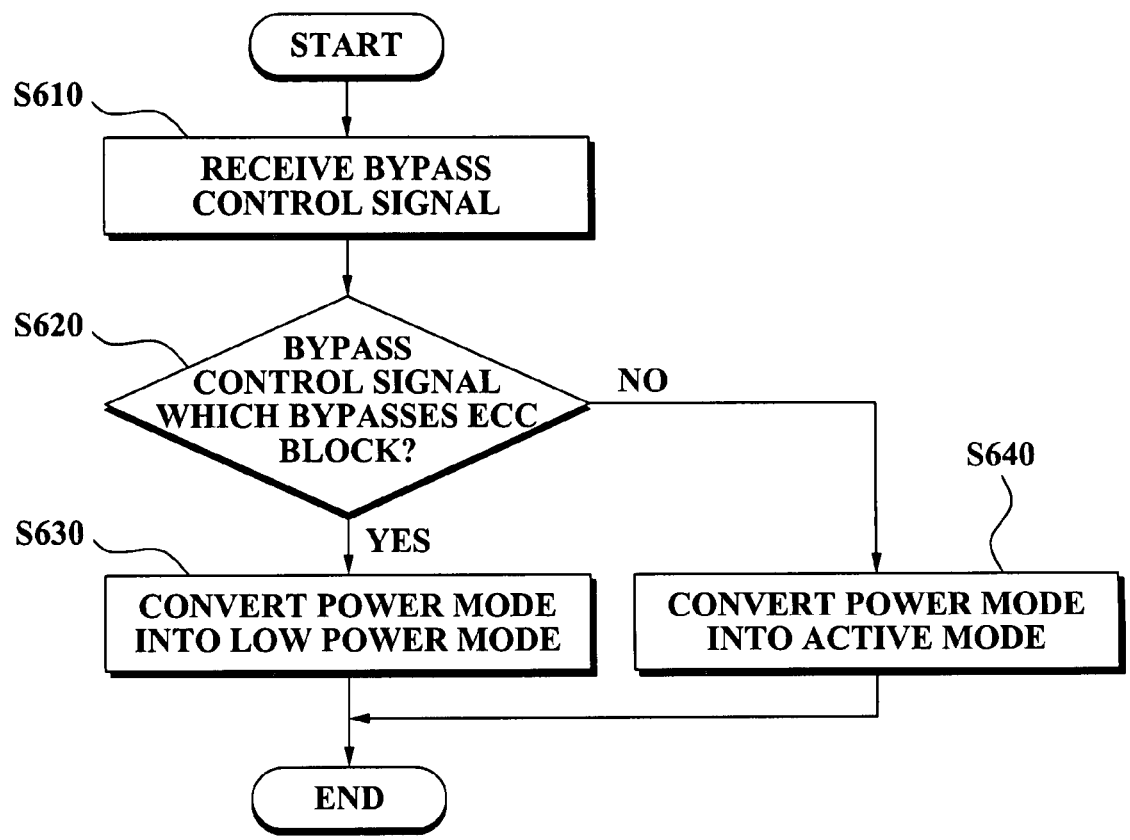
FIG. 6 is a flowchart illustrating converting a power mode of a bypassed ECC block in an ECC method according to example embodiments.

FIG. 6 is a flowchart illustrating converting a power mode of a bypassed ECC block in an ECC method according to example embodiments.

Referring to FIG. 6, the ECC block may receive a bypass control signal $S_b$ generated based on channel information acquired from a channel monitoring result or a user input signal in operation S610.

The ECC block may determine whether the received bypass control signal $S_b$ is the bypass control signal that bypasses the ECC block in operation S620.

When it is determined that the received bypass control signal is the bypass control signal that bypasses the ECC block in operation S620, a power mode may be converted into a lower power mode for not performing an ECC calculation, in operation S630. In example embodiments, since the ECC block may be bypassed, a need for performing the ECC calculation may be eliminated.

Conversely, when it is determined that the received bypass control signal is the bypass control signal that does not bypass the ECC block, that is, the bypass control signal that uses the ECC block in operation S620, the power mode may be converted into an active mode for performing the ECC calculation in operation S640.

As described above, example embodiments may reduce unnecessary power consumption since the power mode may be converted depending on whether the ECC block may be bypassed.

The ECC method according to example embodiments may be recorded in computer-readable media including program instructions to implement various operations embodied by a computer. The media may also include, alone or in combination with the program instructions, data files, data structures, and the like. The media and program instructions may be those specially designed and/or constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of example embodiments.

According to example embodiments, an ECC apparatus and/or method may provide an ECC structure that may control ECC performance depending on an error level generated in a channel, and/or may have low complexity.

Also, according to example embodiments, an ECC apparatus and/or method may bypass a portion of ECC blocks and reduce latency when an error level generated in a channel is lower than (or lower than or equal to) a value that may or may not be predetermined.

Also, according to example embodiments, an ECC apparatus and/or method may convert a power mode of a bypassed ECC block from among ECC blocks into a lower power mode not performing an ECC calculation, and/or may reduce unnecessary power consumption.

Also, according to example embodiments, an ECC apparatus and/or method may reduce an amount of redundant data required for an ECC process and/or may improve a code rate to a total code length by bypassing a portion of ECC blocks.

Also, according to example embodiments, an ECC apparatus and/or method may provide an optimum ECC structure that may control ECC performance, depending on a change of an error level when an error level of a channel side is changed, depending on a number of times of repetitious usage of a product.

Also, according to example embodiments, an ECC apparatus and/or method may provide an optimum ECC structure that may control ECC performance, depending on a change of an error level when an error level of a channel side is changed, depending on a period of time of usage of a product.

Also, according to example embodiments, an ECC apparatus and/or method may provide an optimum ECC structure that may control ECC performance, depending on a change of a channel error level by a SLC operation method and/or an MLC operation method of a memory cell when a memory is used for a channel.

Also, according to example embodiments, an ECC apparatus and/or method may provide an optimum ECC structure that may control ECC performance depending on a change of a channel error level based on a storage bit including an LSB, an MSB, and the like when a memory of an MLC operation method is used for a channel.

While example embodiments have been particularly shown and described, it will be understood by those of ordinary skill in the art that various changes in form and details may be made therein without departing from the spirit and scope of the present invention as defined by the following claims.

What is claimed is:

1. An Error Control Code (ECC) apparatus applied to a memory of a Multi-Level Cell (MLC) method, the apparatus comprising:
    a bypass control signal generator generating a bypass control signal; and
    an ECC performing unit, including at least two ECC decoding blocks, determining whether to bypass a portion of the at least two ECC decoding blocks based on the bypass control signal, and performing an ECC decoding.

2. The apparatus of claim 1, wherein the bypass control signal generator generates the bypass control signal based on channel information.

3. The apparatus of claim 2, wherein the channel information is a Bit Error Rate (BER) of a channel side.

4. The apparatus of claim 3, wherein the bypass control signal generator compares the BER of the channel side and a standard BER, and, based on the comparing of the BER of the channel side and the standard BER, generates a first signal as the bypass control signal that does not bypass the portion of the at least two ECC decoding blocks and enables the ECC decoding to be performed, or generates a second signal as the bypass control signal that bypasses the portion of the at least two ECC decoding blocks and enables the ECC decoding to be performed.

5. The apparatus of claim 2, wherein the channel information is a Received Signal Strength Indication (RSSI) of a channel side.

6. The apparatus of claim 2, wherein the channel information is a user input signal inputted from a user.

7. The apparatus of claim 2, wherein the channel information is the channel information of the memory.

8. The apparatus of claim 1, wherein an ECC decoding block receives the bypass control signal and converts a power mode into another power mode corresponding to the received bypass control signal.

9. The apparatus of claim 8, wherein when the received bypass control signal is the bypass control signal that bypasses the ECC decoding block, the ECC decoding block converts the power mode into a lower power mode.

10. The apparatus of claim 1, wherein the ECC performing unit comprises:
    a first ECC decoding block performing the ECC decoding of data inputted in the ECC performing unit;
    a second ECC decoding block performing the ECC decoding of output data of the first ECC decoding block; and
    a bypass determiner receiving the output data of the first ECC decoding block and output data of the second ECC decoding block, and outputting the output data of the first ECC decoding block or the output data of the second ECC decoding block based on the bypass control signal.

11. The apparatus of claim 10, wherein the bypass determiner is a multiplexer selecting and outputting the output data of the first ECC decoding block or the output data of the second ECC decoding block, based on the bypass control signal, using the bypass control signal as a selection signal.

12. The apparatus of claim 1, wherein the ECC performing unit comprises:
    a first ECC decoding block performing the ECC decoding of data inputted in the ECC performing unit;
    a bypass determiner receiving the data inputted in the ECC performing unit and output data of the first ECC decoding block, and outputting the data inputted in the ECC performing unit or the output data of the first ECC decoding block based on the bypass control signal; and
    a second ECC decoding block performing the ECC decoding of the output data of the bypass determiner.

13. An Error Control Code (ECC) apparatus applied to a memory of a Multi-Level Cell (MLC) method, the apparatus comprising:
    a bypass control signal generator generating a bypass control signal; and
    an ECC performing unit, including at least two ECC encoding blocks, determining whether to bypass a portion of the at least two ECC encoding blocks based on the bypass control signal, and performing an ECC encoding.

14. The apparatus of claim 13, wherein the bypass control signal generator generates the bypass control signal based on channel information.

15. The apparatus of claim 14, wherein the channel information is a Bit Error Rate (BER) of a channel side.

16. The apparatus of claim 15, wherein the bypass control signal generator compares the BER of the channel side and a standard BER, and, based on the comparing of the BER of the channel side and the standard BER, generates a first signal as the bypass control signal that does not bypass the portion of the at least two ECC encoding blocks and enables the ECC encoding to be performed, or generates a second signal as the bypass control signal that bypasses the portion of the at least two ECC encoding blocks and enables the ECC encoding to be performed.

17. The apparatus of claim 14, wherein the channel information is a Received Signal Strength Indication (RSSI) of a channel side.

18. The apparatus of claim 14, wherein the channel information is a user input signal inputted from a user.

19. The apparatus of claim 14, wherein the channel information is the channel information of the memory.

20. The apparatus of claim 13, wherein an ECC encoding block receives the bypass control signal and converts a power mode into another power mode corresponding to the received bypass control signal.

21. The apparatus of claim 20, wherein when the received bypass control signal is the bypass control signal that bypasses the ECC encoding block, the ECC encoding block converts the power mode into a lower power mode.

22. The apparatus of claim 13, wherein the ECC performing unit comprises:
    a first ECC encoding block performing the ECC encoding of data inputted in the ECC performing unit;
    a second ECC encoding block performing the ECC encoding of output data of the first ECC encoding block; and
    a bypass determiner receiving the output data of the first ECC encoding block and output data of the second ECC encoding block, and outputting the output data of the first ECC encoding block or the output data of the second ECC encoding block based on the bypass control signal.

23. The apparatus of claim 22, wherein the bypass determiner is a multiplexer selecting and outputting the output data of the first ECC encoding block or the output data of the second ECC encoding block, based on the bypass control signal, using the bypass control signal as a selection signal.

24. The apparatus of claim 13, wherein the ECC performing unit comprises:
   a first ECC encoding block performing the ECC encoding of data inputted in the ECC performing unit;
   a bypass determiner receiving the data inputted in the ECC performing unit and output data of the first ECC encoding block, and outputting the data inputted in the ECC performing unit or the output data of the first ECC encoding block based on the bypass control signal; and
   a second ECC encoding block performing the ECC encoding of the output data of the bypass determiner.

25. The apparatus of claim 13, wherein the ECC performing unit further includes at least two ECC decoding blocks,
   wherein the ECC performing unit determines whether to bypass a portion of the at least two ECC decoding blocks based on the bypass control signal, and
   wherein the ECC performing unit performs ECC decoding.

26. An Error Control Code (ECC) method applied to a memory of a Multi-Level Cell (MLC) method, the ECC method comprising:
   generating a bypass control signal;
   determining whether to bypass a portion of at least two ECC decoding blocks based on the bypass control signal; and
   performing ECC decoding.

27. An Error Control Code (ECC) method applied to a memory of a Multi-Level Cell (MLC) method, the ECC method comprising:
   generating a bypass control signal;
   determining whether to bypass a portion of at least two ECC encoding blocks based on the bypass control signal; and
   performing ECC encoding.

28. A tangible computer-readable recording medium having stored thereon a program for a computer to implement an Error Control Code (ECC) method applied to a memory of a Multi-Level Cell (MLC) method, the ECC method comprising:
   generating a bypass control signal;
   determining whether to bypass a portion of at least two ECC decoding blocks based on the bypass control signal; and
   performing ECC decoding of data.

29. A tangible computer-readable recording medium having stored thereon a program for a computer to implement an Error Control Code (ECC) method applied to a memory of a Multi-Level Cell (MLC) method, the ECC method comprising:
   generating a bypass control signal;
   determining whether to bypass a portion of at least two ECC encoding blocks based on the bypass control signal; and
   performing ECC encoding of data.

* * * * *